(12) United States Patent
Nakazawa

(10) Patent No.: US 7,853,798 B2
(45) Date of Patent: Dec. 14, 2010

(54) PROGRAM TAMPER DETECTING APPARATUS, METHOD FOR PROGRAM TAMPER DETECTION, AND PROGRAM FOR PROGRAM TAMPER DETECTION

(75) Inventor: Takeshi Nakazawa, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1268 days.

(21) Appl. No.: 11/050,425

(22) Filed: Feb. 4, 2005

(65) Prior Publication Data
US 2005/0198521 A1 Sep. 8, 2005

(30) Foreign Application Priority Data
Feb. 6, 2004 (JP) .............................. 2004-031272

(51) Int. Cl.
G06F 11/30 (2006.01)
G06F 12/14 (2006.01)

(52) U.S. Cl. ........................ 713/187; 713/188; 713/189; 713/194

(58) Field of Classification Search ................. 713/187, 713/189, 194, 188
See application file for complete search history.

(56) References Cited

U.S. PATENT DOCUMENTS

| | | | |
|---|---|---|---|
| 5,224,160 A | | 6/1993 | Paulini et al. |
| 5,442,645 A | | 8/1995 | Ugon et al. |
| 5,757,919 A | | 5/1998 | Herbert et al. |
| 5,915,025 A | * | 6/1999 | Taguchi et al. ................. 380/44 |
| 6,175,924 B1 | * | 1/2001 | Arnold ........................ 713/189 |
| 2002/0002676 A1 | * | 1/2002 | Kawasaki et al. ........... 713/161 |
| 2003/0046238 A1 | * | 3/2003 | Nonaka et al. ................. 705/51 |
| 2004/0054908 A1 | * | 3/2004 | Circenis et al. ............. 713/176 |

FOREIGN PATENT DOCUMENTS

| | | |
|---|---|---|
| EP | 0 768 601 A1 | 4/1997 |
| EP | 0 961 193 A2 | 12/1999 |
| EP | 1 168 172 A2 | 1/2002 |
| JP | 59-188897 | 10/1984 |
| JP | 5-197633 | 8/1993 |

(Continued)

OTHER PUBLICATIONS

Wikipedia Entry Comparison of disk encryption software http://en.wikipedia.org/wiki/Comparison_of_disk_encryption_software.*

(Continued)

Primary Examiner—Farid Homayounmehr
Assistant Examiner—Benjamin A Kaplan
(74) Attorney, Agent, or Firm—McGinn IP Law Group, PLLC

(57) ABSTRACT

A program tamper detecting apparatus includes an external memory, an activation ROM and a CPU. The external memory stores a first code for program tamper detecting and a first program, wherein the first program is encrypted. The activation ROM stores a second program for decrypting the first program. The CPU is electrically connected to the external memory and the activation ROM. The CPU decrypts the first program by executing the second program to obtain the decrypted first program. The CPU detects tampering of the first program based on a comparison between the first code and a result of a predetermined operation executed on second codes of the decrypted first program.

23 Claims, 10 Drawing Sheets

FOREIGN PATENT DOCUMENTS

| | | |
|---|---|---|
| JP | 05-200153 | 8/1993 |
| JP | 8-305558 | 11/1996 |
| JP | 09-024151 | 1/1997 |
| JP | 09-282155 | 10/1997 |
| JP | 10-040095 | 2/1998 |
| JP | 11-126174 | 5/1999 |
| JP | 2000-59358 | 2/2000 |
| JP | 2003-186560 | 7/2003 |
| WO | WO 01/67218 A1 | 9/2001 |

OTHER PUBLICATIONS

Microsoft® Computer Dictionary, Fifth Edition Pub Date: May 1, 2002 Excerpt: Deffinition: BIOS.*
Korean Office Action dated Feb. 24, 2007 with English translation.
Japanese Office Action dated Apr. 1, 2008, with English Language Translation.
Combined Search and Examination Report dated May 23, 2005.

* cited by examiner

PROGRAM TAMPER DETECTING APPARATUS, METHOD FOR PROGRAM TAMPER DETECTION, AND PROGRAM FOR PROGRAM TAMPER DETECTION

BACKGROUND OF THE INVENTION

1. Field of the Invention

The present invention relates to a program tamper detecting apparatus, a method for program tamper detection, and a program for program tamper detection for preventing tampering with a computer program.

2. Description of the Related Art

In recent years, with rapid advances in computer technology, a wide variety of products mount computers. Such computers require a CPU (central processing unit) and computer programs for running the CPU. The computer program mounted in a product, such as a home electrical appliance or a communication apparatus, is designed based on specifications unique to that product. For example, a receiver for use in a pay broadcasting system is preferably usable only to an individual person having an agreed-upon reception contract. Accordingly, also the computer program to be mounted in the receiver is designed to be operable only in the event that the receiver is properly or legally used. The computer program for activating such a receiver is stored in a ROM (read-only memory) and is read in the event of activation of the receiver. The computer controls the receiver by execution of the read computer program.

In the field of apparatuses which performs electronic control by using a computer, similar to the case of a main body of the apparatus, it costs very much for developing of a computer program that is to be stored in the ROM in the apparatus. Such computer programs are important properties of businesses. For example, as for the above-described pay broadcasting system, suppose that a program for activating a receiver for receiving a pay-broadcast is known to a third party not having an agreed-upon reception contract. This implies that services provided by the pay broadcasting system may probably be used by the illegal third party. In addition, the computer program is an intellectual property with respect to the system. In order to protect appropriately the computer program, which is the intellectual property, there is a demand of techniques for preventing a third party from knowing the computer program easily.

Conventionally, specifications of a general-purpose CPU and ROM are widely open to the general public. Under these circumstances, a third party obtaining an apparatus, which includes a computer with the CPU and the ROM, can easily perform program analysis. In this connection, there are techniques known that prevent the third party from performing the program analysis of the computer program stored in the ROM in an apparatus.

The examples of these techniques are shown in the following related art.

Japanese Laid Open Patent Application (JP-Heisei 11-126174 A) discloses a memory data of a microprocessor reading apparatus. The memory data of a microprocessor reading apparatus includes a microprocessor, a memory means and a reading means. The memory means memorizes information data for operating the microprocessor. The reading means reads out the information data in the memory means and sends the information data to the microprocessor. The reading means has a data transforming circuit. The data transforming circuit transforms the information data read out from the memory means by a data dynamically changed during the reading out the information data.

Japanese Laid Open Patent Application (JP-Heisei 08-305558 A) discloses an encrypted program operating apparatus. The encrypted program operating apparatus includes a first memory, a second memory and a read protection means. The first memory stores at least a decryption program. The second memory stores an encrypted-program which is decrypted by the decryption program stored in the first memory. The read protection means protects the decrypted encrypted-program stored in the second memory from reading out the outside.

Japanese Laid Open Patent Application (JP-Heisei 05-197633 A) discloses an integrated circuit. The integrated circuit includes a CPU, a decrypting means and a key code storing means. The CPU executes data processing. The decrypting means decrypts encrypted instruction codes into codes by which the CPU can executes data processing. The key code storing means stores key codes for controlling the data decrypted by the decrypting means.

Japanese Laid Open Patent Application (JP-Showa 59-188897 A) discloses a data security protection device for a data processing apparatus. The data security protection device includes a LSI for data processing with an internal memory and a logic circuit. The internal memory can not allow the outside device to read out its data. The logic circuit performs a proper logical operation between the data read out from an external memory outside of the LSI and the data read out from the internal memory. The internal memory stores a plurality of keyword codes. The external memory stores transformed codes, which are already transformed such that regular data can be obtained by the proper logical operation between the keyword codes and the transformed codes. The data security protection device generates the regular data by reading out addresses from the internal memory and the external memory.

In addition, with advances in semiconductor technology, nonvolatile and programmable/reprogrammable ROMs (such as flash ROMs) have been available, and are widely used for above-mentioned apparatuses. Using these ROMs, it becomes very easy to update a version of the computer program for operating the apparatus. For the apparatuses using such a programmable/reprogrammable ROM ("reprogrammable ROM", hereafter), techniques are demanded which can prevents the illegal reprogramming of a computer program stored in the ROM.

FIG. 1 is a block diagram showing a conventional configuration having the CPU and the ROM ("flash ROM", hereafter). Referring to FIG. 1, a conventional apparatus has a flash ROM 101 and a CPU 102 connected with each other through a bus 103. Further, the flash ROM 101 has a normal area 101*a* and a one-time program area 101*b*.

The normal area 101*a* is an area in which data programmed therein can be reprogrammed, and stores encrypted computer programs. The one-time program area 101*b* is a non-reprogrammable (only one-time programmable) area. The one-time program area 101*b* stores a decryption program for decrypting the encrypted programs. The one-time program area 101*b* stores an activation program for activating the apparatus.

In the activation, the CPU 102 first reads the activation program from the one-time program area 101*b*, and starts the activation of the apparatus. The decryption program decrypts an encrypted program stored in the normal area 101*a* of the flash ROM 101, and concurrently loads the decrypted program into an external RAM (not shown). Thereafter, the loaded program drives the apparatus to operate.

The conventional techniques can prevent the third party from using the apparatus illegally. The techniques are excellent in terms of the prevention of illegal analysis of computer programs. However, further robust program analysis prevention techniques are demanded. Additionally techniques are demanded for preventing tampering with programs. Further techniques are demanded for detecting tampering with a computer program and outputting warning when the computer program is tampered with.

SUMMARY OF THE INVENTION

An object of the present invention is to provide, in an apparatus having an encrypted computer program, an apparatus having a configuration that does not easily allow leakage of an encryption scheme thereof to the outside; and a method and a program therefor.

Another object of the present invention is to provide an apparatus having a configuration that prevents tampering with the encrypted computer program even though the encryption scheme has leaked; and a method and a program therefor.

Still another object of the present invention is to provide an apparatus having a configuration that can detect tampering with a computer program in case of tampering; and a method and a program therefor.

This and other objects, features and advantages of the present invention will be readily ascertained by referring to the following description and drawings.

In order to achieve an aspect of the present invention, the present invention provides a program tamper detecting apparatus including: an external memory; an activation ROM; and a CPU. The external memory stores a first code for program tamper detecting and a first program, wherein the first program is encrypted. The activation ROM stores a second program for decrypting the first program. The CPU is electrically connected to the external memory and the activation ROM. The CPU decrypts the first program by executing the second program to obtain the decrypted first program. The CPU detects tampering of the first program based on a comparison between the first code and a result of a predetermined operation executed on second codes of the decrypted first program.

The program tamper detecting apparatus may further include a RAM. In this case, the CPU stores the decrypted first program in the RAM, reads out the second codes from the RAM, and detects tampering of the first program based on the comparison.

In the program tamper detecting apparatus, the external memory may have an address data which specifies an address in the RAM. In this case, the CPU stores the decrypted first program in the RAM based on the address data, and reads out the second codes from the RAM based on the address data.

In the program tamper detecting apparatus, the activation ROM may have an activation program. In this case, the CPU executes the second program by execution of the activation program, to obtain the decrypted first program.

In the program tamper detecting apparatus, there may be a plurality of the second programs. In this case, an encryption scheme of one of the plurality of second programs is different from that of another of the plurality of second programs. The CPU selects and executes one of the plurality of second programs.

The program tamper detecting apparatus may further include a first memory portion which stores an area data that the CPU is used for selecting one of a plurality of areas included in the activation ROM. In this case, the CPU selects the one of plurality of areas based on the area data. The CPU decrypts the first program by executing one of the plurality of second programs corresponding to the selected one of plurality of areas to obtain the decrypted first program.

The program tamper detecting apparatus may further include a second memory portion which stores an identifier for identifying the program tamper detecting apparatus. In this case, the decrypted first program has an identifier confirming data. The CPU detects tampering of the first program by checking the identifier confirming data with the identifier.

The program tamper detecting apparatus, the activation ROM may have a program tamper notifying program. In this case, the CPU generates a message indicating tampering of the first program, and sends the message to a device with a predetermined address through a network, by executing the program tamper notifying program in response to detection of tampering of the first program.

In the program tamper detecting apparatus, the CPU and the activation ROM are mounted on a single semiconductor device. The semiconductor device is connected to the external memory.

In the program tamper detecting apparatus, the CPU, the activation ROM and the first memory portion may be mounted on a single semiconductor device. In this case, the semiconductor device is connected to the external memory.

In the program tamper detecting apparatus, the CPU executes the decrypted first program to decodes data received through a network, and outputs the decoded data to a processing device, when the CPU does not detect tampering of the first program.

In order to achieve another aspect of the present invention, the present invention provides a computer program product for program tamper detecting apparatus. The program tamper detecting apparatus includes: an external memory, an activation ROM and a CPU. The external memory stores a first code for program tamper detecting and a first program, wherein the first program is encrypted. The activation ROM stores a second program for decrypting the first program. The CPU is electrically connected to the external memory and the activation ROM. The computer program product embodied on a computer-readable medium and including code that, when executed, causes a computer to perform the following: (a) reading out the second program from the activation ROM; (b) executing the second program to obtain the decrypted first program; (c) detecting tampering of the first program based on a comparison between the first code and a result of a predetermined operation executed on second codes of the decrypted first program.

In the computer program product, the program tamper detecting apparatus may further include a RAM. In this case, The step (b) includes: (b1) storing the decrypted first program in the RAM. The step (c) includes: (c1) reading out the second codes from the RAM.

In the computer program product, the step (b) may further includes: (b2) reading out an address data, which specifies an address in the RAM, stored in the external memory. In this case, the step (b1) includes: (b12) storing the decrypted first program in the RAM based on the address data, and the step (c1) includes: (c12) reading out the second codes from the RAM based on the address data.

In the computer program product, the step (a) may include: (a1) executing an activation program stored in the activation ROM to activate the CPU.

In the computer program product, there may be a plurality of the second programs. In this case, the activation ROM has a plurality of areas. Each of the plurality of areas stores corresponding one of the plurality of second programs. An encryption scheme of one of the plurality of second programs is different from that of another of the plurality of second programs. The step (a) includes: (a2) selecting one of the plurality of areas, and (a3) reading out one of the plurality of second programs corresponding to the selected one of plurality of areas. The step (b) includes: (b3) executing the read one of the plurality of second programs.

In the program tamper detecting apparatus, the program tamper detecting apparatus may further include a first memory portion. In this case, the step (a2) includes: (a21) reading out an area data used for selecting the one of plurality of areas, the area data is stored in the first memory portion, and (a22) selecting the one of plurality of areas based on the area data.

In the program tamper detecting apparatus, the program tamper detecting apparatus may further include a second memory portion. In this case, the step (c) includes: (c2) reading out an identifier for identifying the program tamper detecting apparatus, the identifier is stored in the second memory portion, (C3) extracting an identifier confirming data from the decrypted first program, and (c4) detecting tampering of the first program by checking the identifier confirming data with the identifier.

The program tamper detecting apparatus may further include: (d) reading out a program tamper notifying program stored in the activation ROM, and (e) generating a message indicating tampering of the first program, and sending the message to a device with a predetermined address through a network, by executing the program tamper notifying program in response to detection of tampering of the first program.

In order to achieve still another aspect of the present invention, the present invention provides a method for program tamper detection including: (a) reading out a second program for decrypting; (b) executing the second program to obtain a decrypted first program by decrypting a encrypted first program; and (c) detecting tampering of the first program based on a comparison between a predetermined first code and a result of a predetermined operation executed to second codes of the decrypted first program.

In the method for program tamper detection, the step (b) may include: (b1) reading out an address data which specifies an address in a RAM, (b2) storing the decrypted first program in the RAM based on the address data. In this case, The step (c) includes: (c1) reading out the second codes from the RAM based on the address data.

In the method for program tamper detection, the step (a) may include: (a1) executing an activation program for executing the second program.

In the method for program tamper detection, there may be a plurality of the second programs. In this case, an encryption scheme of one of the plurality of second programs is different from that of another of the plurality of second programs. The step (a) includes: (a2) selecting one of the plurality of second programs, and (a3) reading out the one of the plurality of second programs. The step (b) includes: (b3) executing the read one of the plurality of second programs.

In the program tamper detecting apparatus, the step (a3) may include: (a31) reading out an area data used for selecting the one of plurality of areas, and (a32) selecting the one of plurality of areas based on the area data.

In the method for program tamper detection, the step (c) may include: (c2) reading out an identifier, (C3) extracting an identifier confirming data from the decrypted first program, and (c4) detecting tampering of the first program by checking the identifier confirming data with the identifier.

The method for program tamper detection may further include: (d) reading out a program tamper notifying program, and (e) generating a message indicating tampering of the first program, and sending the message to a device with a predetermined address through a network, by executing the program tamper notifying program in response to detection of tampering of the first program.

DESCRIPTION OF THE PREFERRED EMBODIMENTS

Embodiments of a program tamper detecting apparatus according to the present invention will be described below with reference to the attached drawings.

A computer 21 exemplifies a program tamper detecting apparatus. The computer 21 has a program tamper detection function, and is adaptable to any product or apparatus performing electronic control by using a computer. Hereinafter, as an example in this description, the product having the computer 21 is used in the situation that the product is connected with an information communications network. Especially, a receiver for a pay broadcasting system is described as an example of the product. The receiver for a pay broadcasting system tends to cause the problem of tampering with a computer program mounted in the product.

First Embodiment

Figure 1:
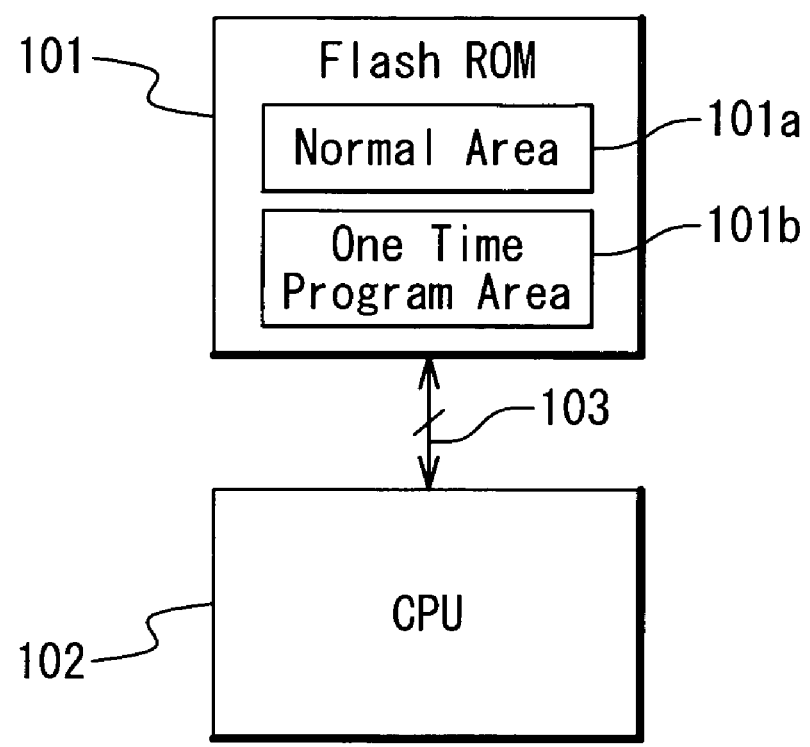
FIG. 1 is a block diagram showing a conventional configuration having the CPU and the ROM.
Figure 2:
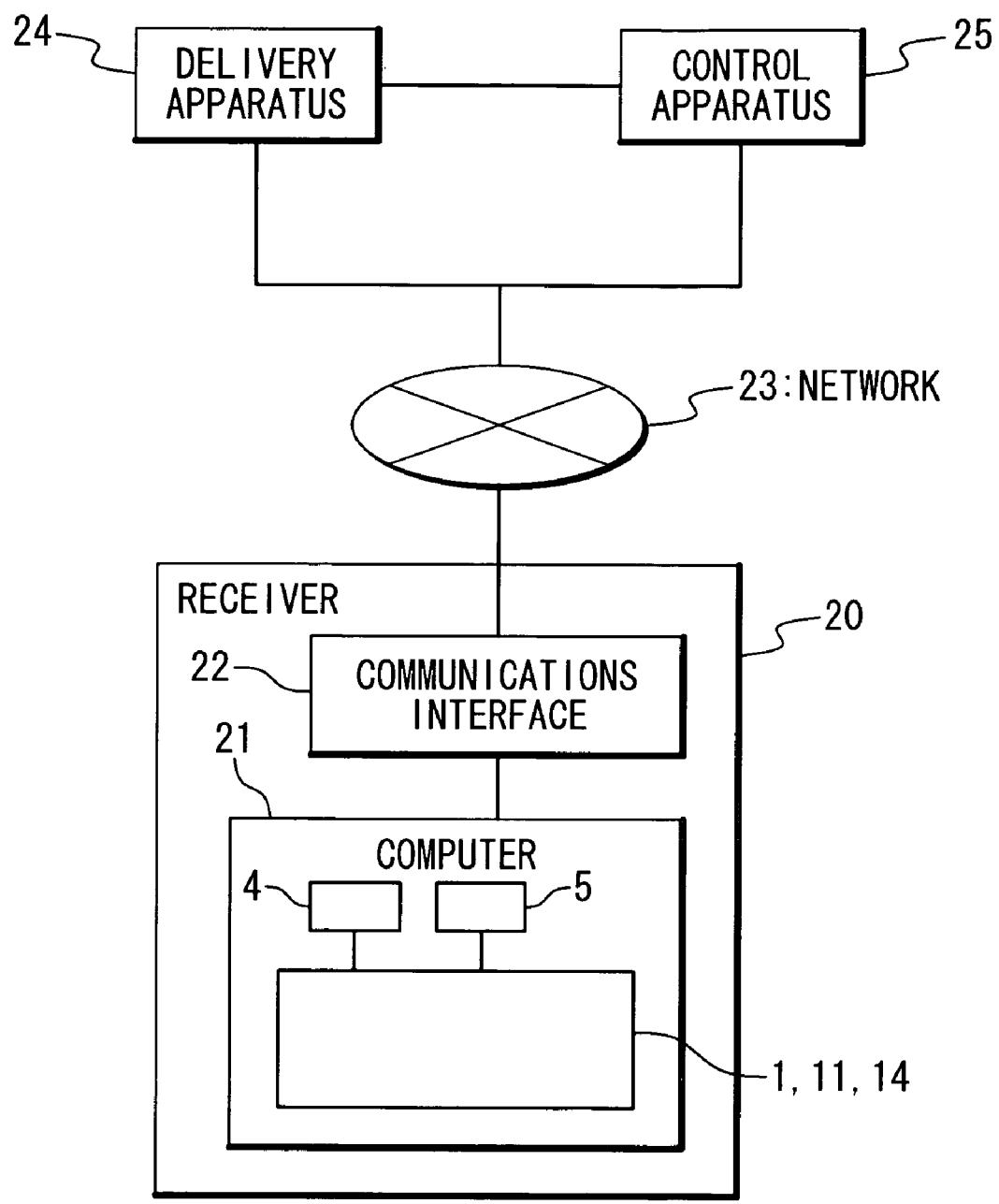
FIG. 2 is a block diagram showing an example of a system configuration wherein the computer 21 according to the present invention is adapted to the receiver of the pay broadcasting system.

FIG. 2 is a block diagram showing an example of a system configuration wherein the computer 21 according to the present invention is adapted to the receiver of the pay broadcasting system. With reference to FIG. 2, the pay broadcasting system includes a delivery apparatus 24, a control apparatus 25 and a receiver 20. The delivery apparatus 24 is provided in a broadcast delivery side. The receiver 20 is provided in a receiving side to receive pay broadcasts. The delivery apparatus 24 transmits the pay broadcasts through the network 23. The pay broadcasts are services provided by the pay broadcasting system. The control apparatus 25 controls, for example, a delivery state of the pay broadcasts and a reception state of the receiver 20. Through the network 23, the receiver 20 receives data of pay broadcasts transmitted from the delivery apparatus 24, and outputs it to a display unit. Here, the display unit is not shown in Figures.

The receiver 20 includes the computer 21 and a communications interface 22. The computer 21 has an LSI 1 or an LSI 11 in the second embodiment, or an LSI 14 in the third embodiment, a reprogrammable external ROM 4, and a RAM 5. The computer 21 is connected to the network 23 through the communications interface 22. The communications interface 22, which is connected to the network 23, transmits data outputted from the computer 21 to the delivery apparatus 24 through the network 23.

Figure 3:
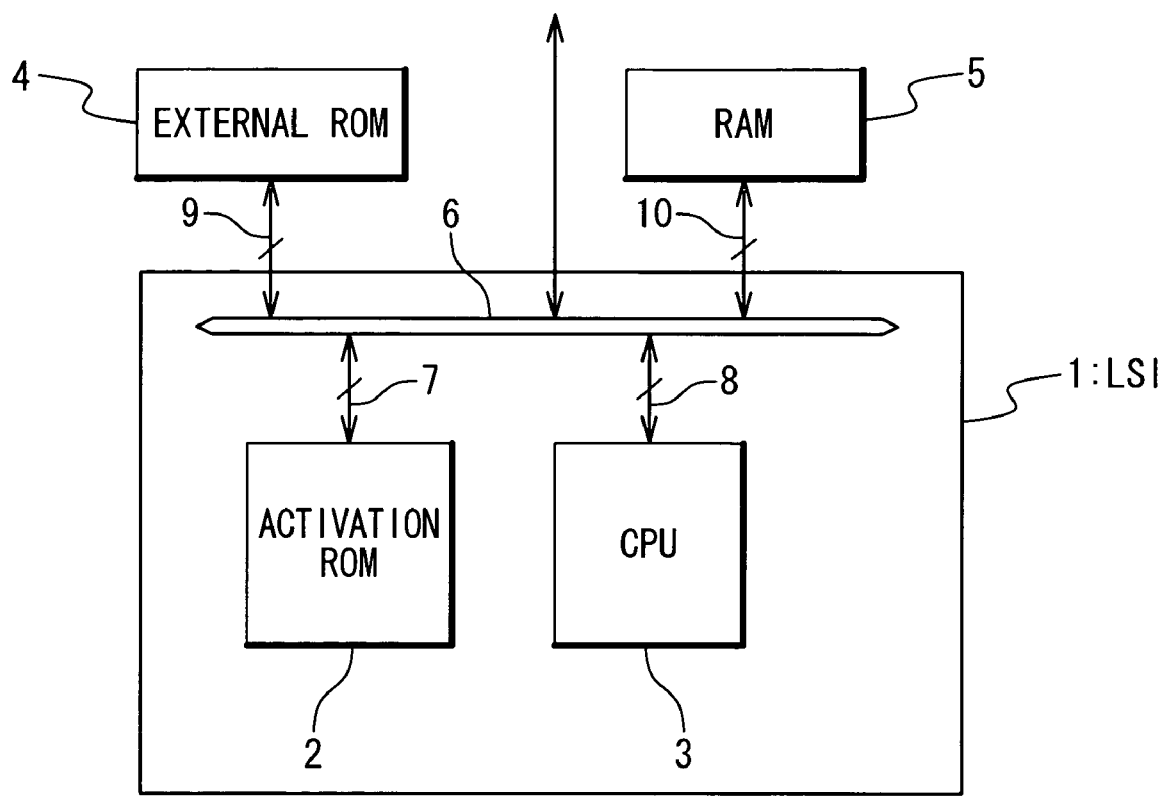
FIG. 3 is a block diagram showing a configuration of the program tamper detecting apparatus provided in the computer 21 according to the first embodiment of the present invention.

FIG. 3 is a block diagram showing a configuration of the program tamper detecting apparatus provided in the computer 21 according to the first embodiment of the present invention. With reference to FIG. 3, the program tamper detecting apparatus according to the first embodiment includes the LSI 1, the external ROM 4, and the RAM 5. The LSI 1 includes an activation ROM 2, a CPU 3, and an internal bus 6. The LSI 1 is an integrated circuit configured of a single chip. The LSI 1 is connected to the external ROM 4 through a data line 9, and is connected to the RAM 5 through a data line 10.

The activation ROM 2 is non-reprogrammable for data stored therein. The activation ROM 2 is connected to the internal bus 6 through a data line 7. The activation ROM 2 is also connected to the CPU 3, the external ROM 4, and the RAM 5 through the internal bus 6. The activation ROM 2 is only used immediately after activation of the computer 21. The activation ROM 2 stores a CPU-activation program and a decryption program for decrypting and loading an encrypted program stored in the external ROM 4. The CPU 3 is activated by the CPU-activation program, and reads the decryption program from the activation ROM 2 based on the CPU-activation program. The CPU 3 further reads the encrypted program in the external ROM 4 based on the decryption program, and executes decryption of the encrypted program. The CPU 3 executes the program decrypted and loaded into the RAM 5, and controls the computer 21 by executing the program. The CPU 3 is connected to the internal bus 6 through a data line 8. The CPU 3 is also connected to the activation ROM 2, external ROM 4, and RAM 5 through the internal bus 6.

The reprogrammable external ROM 4 is a storage device that allows reprogramming of data stored therein and that has a nonvolatile storage area. The reprogrammable external ROM 4 is connected to the LSI 1 through the data line 9, and stores encryption programs. The reprogrammable external ROM 4 outputs the encryption program in response to the request from the LSI 1. The RAM 5 is a storage device for storing post-decryption programs. The RAM 5 is connected to the LSI 1 through the data line 10, and stores encryption programs, which are decrypted by the decryption program stored in the activation ROM 2, as post-decryption programs.

Receiver 20 receives multimedia data such as MPEG stream data from the delivery apparatus 24 through the network 23. The computer 21 executes the post-decryption programs to perform the operation which inputs the received multimedia data to a MPEG decoder to decode the received multimedia data normally, when the computer 21 judges that tampering with the user code stored in external ROM 5 does not occur. Here, the MPEG decoder is not shown in Figures.

The computer 21 controls the MPEG decoder not to decode the received multimedia data, when the computer 21 judges that tampering with the user code stored in external ROM 5 occur. In this case, the computer 21 sends a message indicating the tampering with the user code through the network 23 to the delivery apparatus 24.

Figure 4:
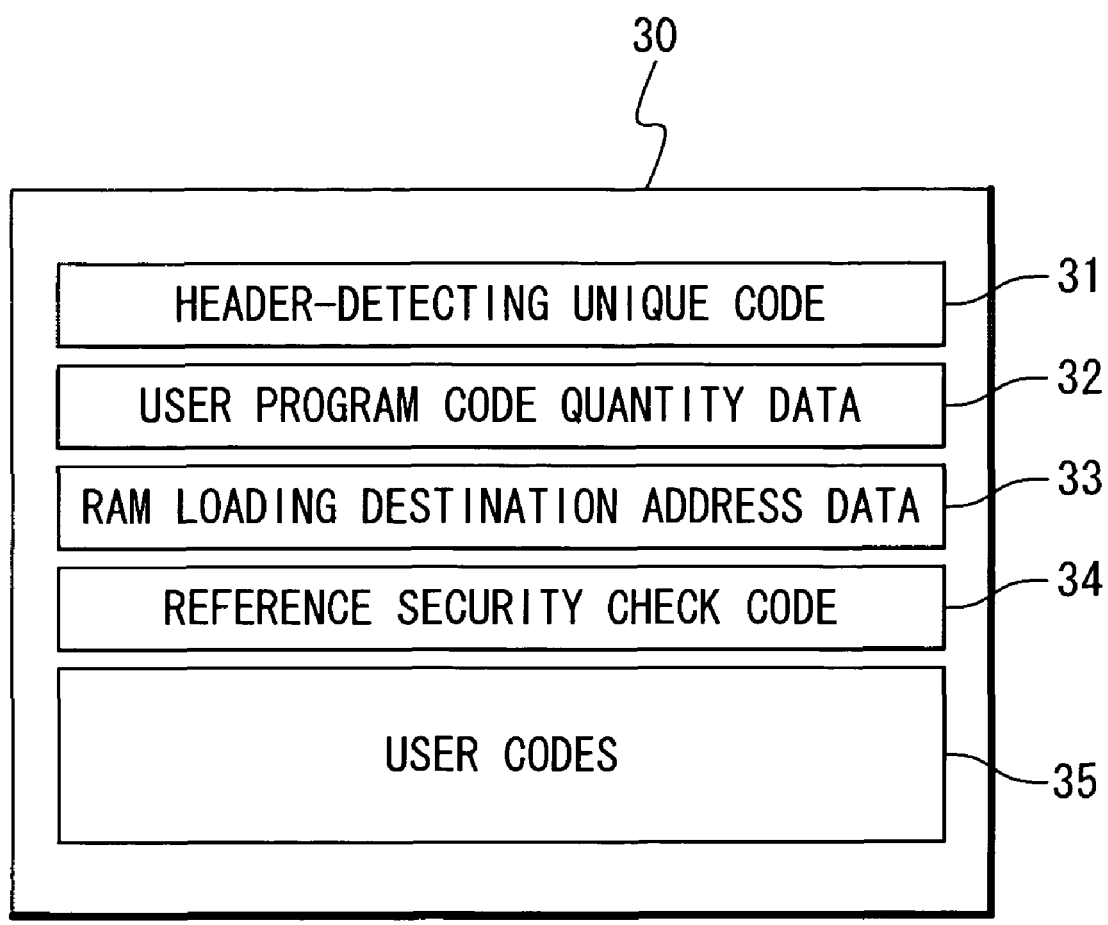
FIG. 4 is a view showing an internal format 30 of the reprogrammable external ROM 4.

FIG. 4 is a view showing an internal format 30 of the reprogrammable external ROM 4. With reference to FIG. 4, an data storage area of the reprogrammable external ROM 4 includes a header portion and areas other than the header portion. The header portion includes a plurality of areas. Each of the plurality of areas stores one of header-detecting unique codes 31, user program code quantity data 32, RAM loading destination address data 33, and reference security check codes 34.

The header-detecting unique code 31 is used to establish access to data stored in the reprogrammable external ROM 4. The user program code quantity data 32, the RAM loading destination address data 33, and the reference security check code 34 are data to be stored in the reprogrammable external ROM 4 consecutively to the header-detecting unique code 31. The user program code quantity data 32 is used to determine whether or not a code quantity of the decrypted program to be loaded into the RAM 5 reaches a predetermined code quantity. The RAM loading destination address data 33 is a data showing the address of the RAM 5. In the case of loading of the decrypted program into the RAM 5, the CPU 3 loads the decrypted program into the RAM 5 based on the RAM loading destination address data 33. In addition, in the case of reading out of a post-decryption program stored in the RAM 5, the CPU 3 performs a reading operation of data based on the RAM loading destination address data 33. The reference security check code 34 is used to detect the tampering with a post-decryption program. User codes 35 are the encrypted program stored in the reprogrammable external ROM 4.

Figure 5:
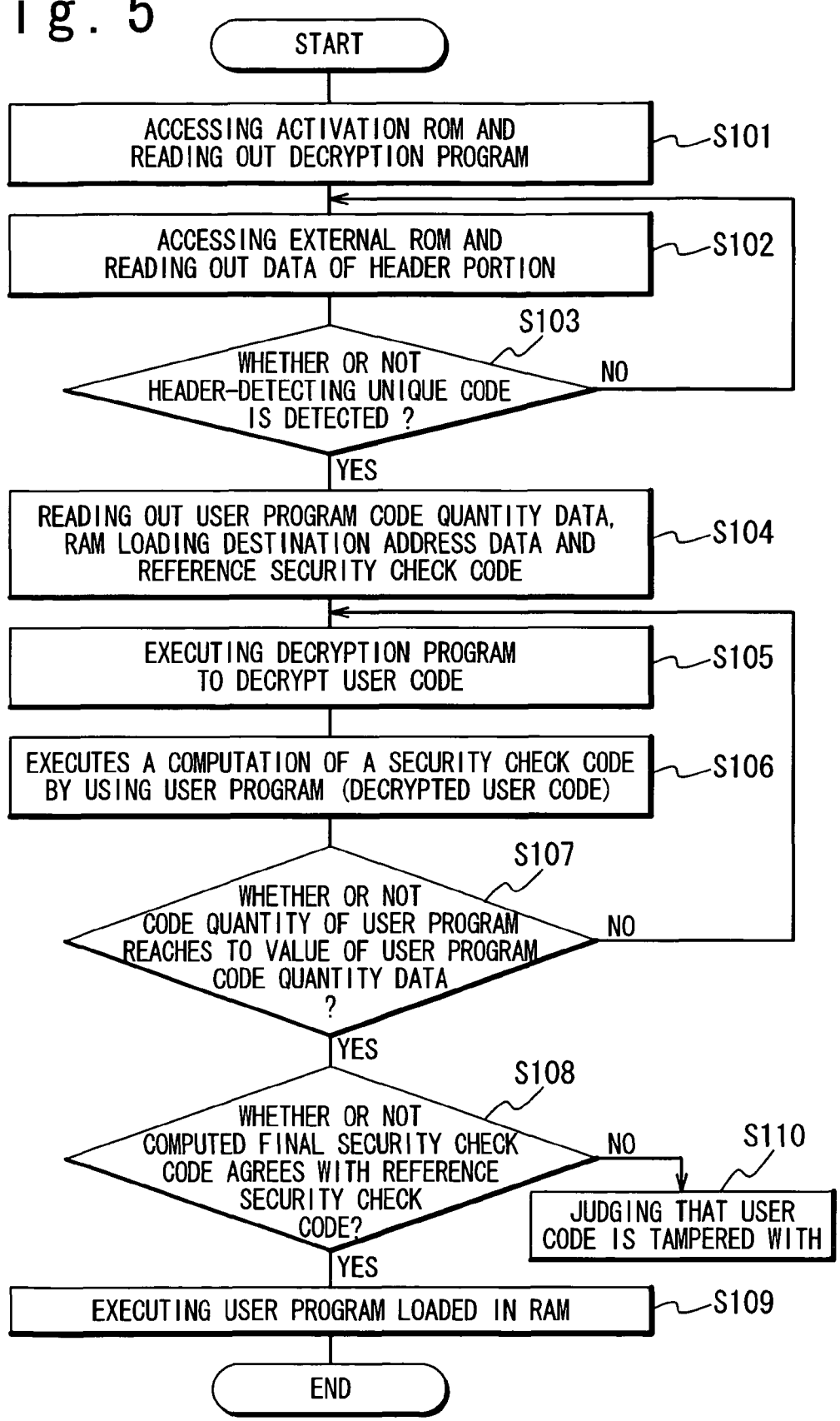
FIG. 5 is a flowchart showing an operation of the first embodiment.

FIG. 5 is a flowchart showing an operation of the first embodiment. Hereinafter, the following terminology is used to clearly distinguish an encrypted program from a program decrypted and loaded into the RAM 5. A "user code" 35 refers to a program, or an encrypted program, stored in the reprogrammable external ROM 4. A "user program" refers to a program formed in the manner that the user code 35, which is the encrypted program, is decrypted and loaded into the RAM 5.

Referring to FIG. 5, the operation in the first embodiment starts upon power-on performed by activating, or resetting the receiver 20. In the step S101, the activation ROM 2 executes the CPU-activation program, which is stored in the activation ROM 2, in response to the activation of the receiver 20, thereby to activate the CPU 3. The activated CPU 3 accesses the activation ROM 2 through the internal bus 6, reads out and executes a decryption program stored in the activation ROM 2.

In the step S102, the CPU 3 accesses the reprogrammable external ROM 4 and then performs a reading operation of data stored in the header portion of the reprogrammable external ROM 4. In the step S103, the CPU 3 judges whether or not the CPU 3 detects a header-detecting unique code 31. If the CPU 3 detects the header-detecting unique code 31, the processing proceeds to the step S104. On the other hand, if the CPU 3 does not detect the header-detecting unique code 31, the processing returns to the S102 and again executes the reading operation therein. That is, if no header-detecting unique code 31 is detected, the operations of from the steps S102 to S103 are executed.

In the step S104, after detecting the header-detecting unique code 31, the CPU 3 performs reading operations of data consecutive to the header-detecting unique code 31, namely, a user program code quantity data 32, a RAM loading destination address data 33, and a reference security check code 34. In the step S105, after performing the reading operations of the user program code quantity data 32, the RAM loading destination address data 33, and the reference security check code 34, the CPU 3 performs a reading operation of the user code 35 stored in the reprogrammable external ROM 4. Then, the CPU 3 executes the decryption program thereby to decrypt the user code 35 and to load it into the RAM 5.

In this case, any encryption scheme may be used for the encryption scheme to encrypt the decrypted program. For example, the scheme may encrypt the user code 35 in the following manner. That is, firstly, the user code 35 is read out by the unit of a plurality of bits thereof, and then an EXOR operation is executed by using a predetermined decryption key that enables decryption in correspondence to the plurality of bits. Alternatively, a more intricate encryption/decryption scheme may be employed, thereby to make it possible to construct an even higher security system.

Subsequently, in the step S106, the CPU 3 executes a computation of a security check code based on a predetermined algorithm by using a user program in binary code which is the post-decryption program loaded into the RAM 5. For the algorithm to be executed therein, any algorithm may be used.

Subsequently, in the step S107, the CPU 3 executes a comparison between a code quantity of the user program, which is loaded into the RAM 5, and the user program code quantity data 32, which is read out at the S104. From the result of the comparison, if the code quantity of the user program does not reach to the value of the user program code quantity data 32, the processing returns to the step S105. That is, decrypting of a user code 35 read out, loading thereof into the RAM 5, and computing of a next security check code are executed.

The operations in the steps S105 to the S107 will be described below in more detail. For example, the EXOR operations are used for the predetermined algorithm, firstly, a predetermined first fixed value of 32 bits and a second fixed value of 32 bits are set and stored in a predetermined area. The CPU 3 executes the EXOR operation between the first fixed value and first 32 bits of the user code 35, and thereby obtains a 32-bit user program in the step S105. Then the CPU 3 executes computation to produce a first security check code based on the EXOR operation between the 32-bit user program and the second fixed value in the step S106.

After the computation of the first security check code, the CPU 3 judges whether or not the code quantity of the user program, which is loaded into the RAM 5, reaches the value of the user program code quantity data 32 in the step S107. From the result of the comparison, if the code quantity of the user program does not reach the value of the user program code quantity data 32, the processing returns to the step S105. That is, the processing executes the EXOR operation between the first fixed value and subsequent 32 bits of the user code 35, and thereby obtains a new 32-bit user program in the step S105. Then, the CPU 3 executes the EXOR operation between the obtained new 32-bit user program and the second fixed value, and thereby computes a second security check code in the step S106.

The CPU 3 repeats the operations of from the S105 to the S107 until it finds an agreement between the code quantity of the user program and the value of the user program code quantity data 32. The CPU 3 determines the obtained security check code, of which the two values agree with each other, to be a final security check code for the overall user program. In addition, based on the agreement between the code quantity of the user program and the value of user program code quantity data 32, the CPU 3 recognizes that all the user codes 35 are decrypted.

In the step S108, the CPU 3 executes a comparison between the computed final security check code and the reference security check code 34. From the a result of the comparison, if the computed final security check code does not agree with the reference security check code 34, the CPU 3 judges that the user code 35 is tampered with in the step S110. In the step S110, if the user code 35 is tampered with, the CPU 3 of the computer 21 generates a tamper detection message and outputs the message to the communications interface 22. The outputted message is then transmitted to the control apparatus 25 of the pay broadcasting system through the network 23. On the other hand, if the computed security check code agrees with the reference security check code 34, the processing goes to S109. In the step S109, the CPU 3 of the computer 21 executes the user program loaded in the RAM 5, thereby to control the receiver 20 to operate. In the step S109, the LSI 1 of the computer 21 prohibits an access to the activation ROM 2 of the receiver 20 in response to the start of the operation of the receiver 20 by the user program loaded into the RAM 5. The access prohibition continues till the end of operation, such as power-off, of the computer 21.

Thus, based on the operation shown in the flowchart, not only the security measures by the decryption program stored in the activation ROM 2, but also the security check using the code of the decrypted user program is executed. This makes it possible to implement further robust protection of programs provided in the computer 21 with program tamper detection functionality.

Second Embodiment

Figure 6:
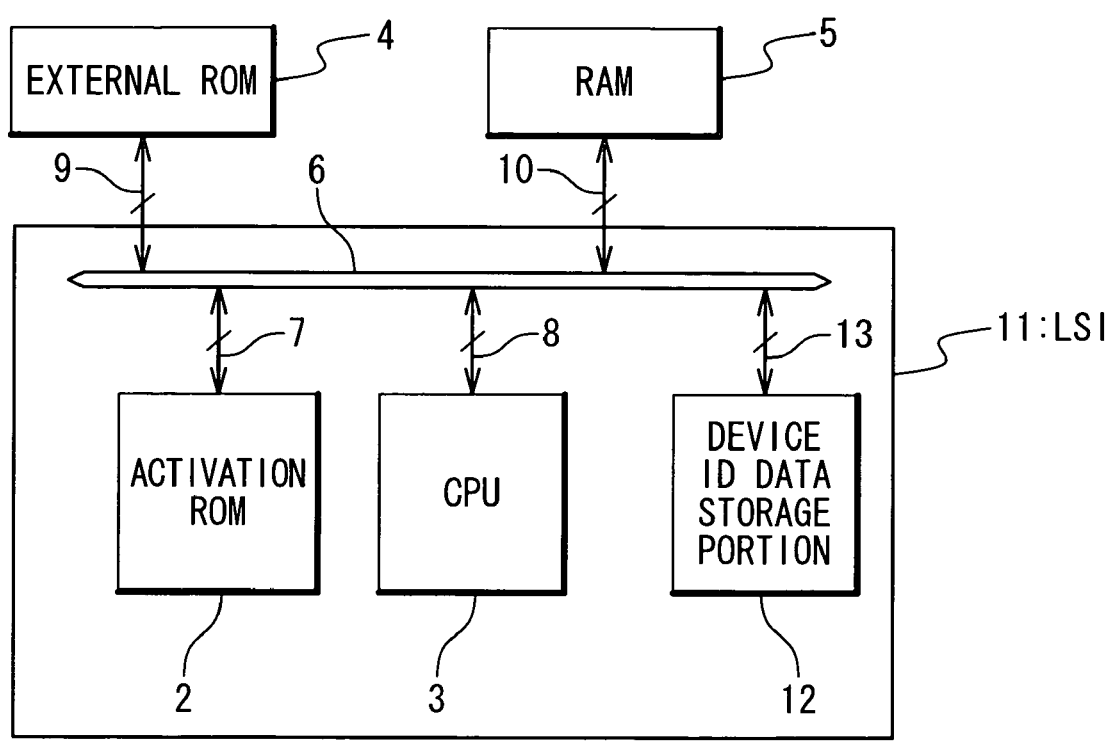
FIG. 6 is a block diagram showing the configuration of a program tamper detecting apparatus provided in a computer 21 according to the second embodiment of the present invention.

FIG. 6 is a block diagram showing the configuration of a program tamper detecting apparatus provided in a computer 21 according to the second embodiment of the present invention. Similar to the first embodiment, the program tamper detecting apparatus in this embodiment is adaptable to any product performing electronic control by using a computer. Similar to the first embodiment, the product having the computer 21 in this embodiment is used in the situation that the product is connected with an information communications network. Especially, a receiver 20 for a pay broadcasting system is described as an example of the product. The receiver for a pay broadcasting system tends to cause the problem of tampering with a computer program mounted in the product.

With reference to FIG. 6, the program tamper detecting apparatus described in the second embodiment includes an LSI 11, a reprogrammable external ROM 4, and a RAM 5. The LSI 11 includes an activation ROM 2, a CPU 3, an internal bus 6, and a device ID (identifier) data storage portion 12. Similar to the LSI 1, the LSI 11 is an integrated circuit configured as a single chip. The activation ROM 2 and the CPU 3 of the LSI 11 is similar to those of the LSI 1 described in the first embodiment. Therefore, descriptions of the activation ROM 2 and the CPU 3 of the LSI 11 are omitted. In addition, the reprogrammable external ROM 4 and the RAM 5 in this embodiment are similar to those in the first embodiment. Therefore, descriptions of the reprogrammable external ROM 4 and the RAM 5 in this embodiment are also omitted.

The device ID data storage portion 12 is a storage area for storing device ID data. The device ID data indicates device ID allocated to semiconductor device. The device ID data storage portion 12 has a register or a data storage function equivalent to the register, and is connected to the internal bus 6 through a data line 13. The device ID is set a value determined in the design stage, and semiconductor devices of the same design are allocated with a same ID. Semiconductor devices, which have the same design but different in derivation from each other, are each allocated with a different, unique ID in units of the different derivation.

Figure 7A:
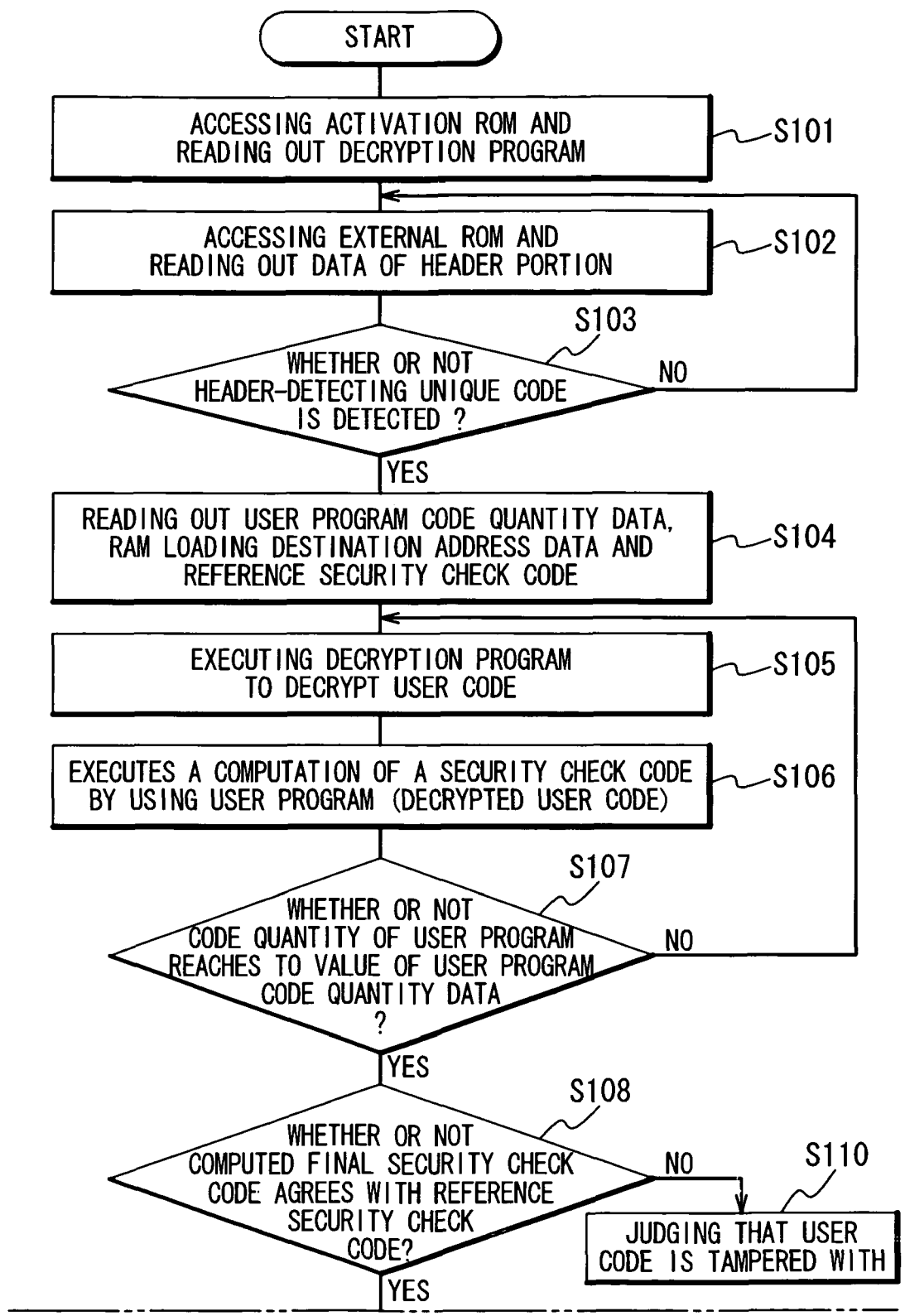
FIGS. 7A and 7B are flowcharts showing the operation of the second embodiment.
Figure 7B:
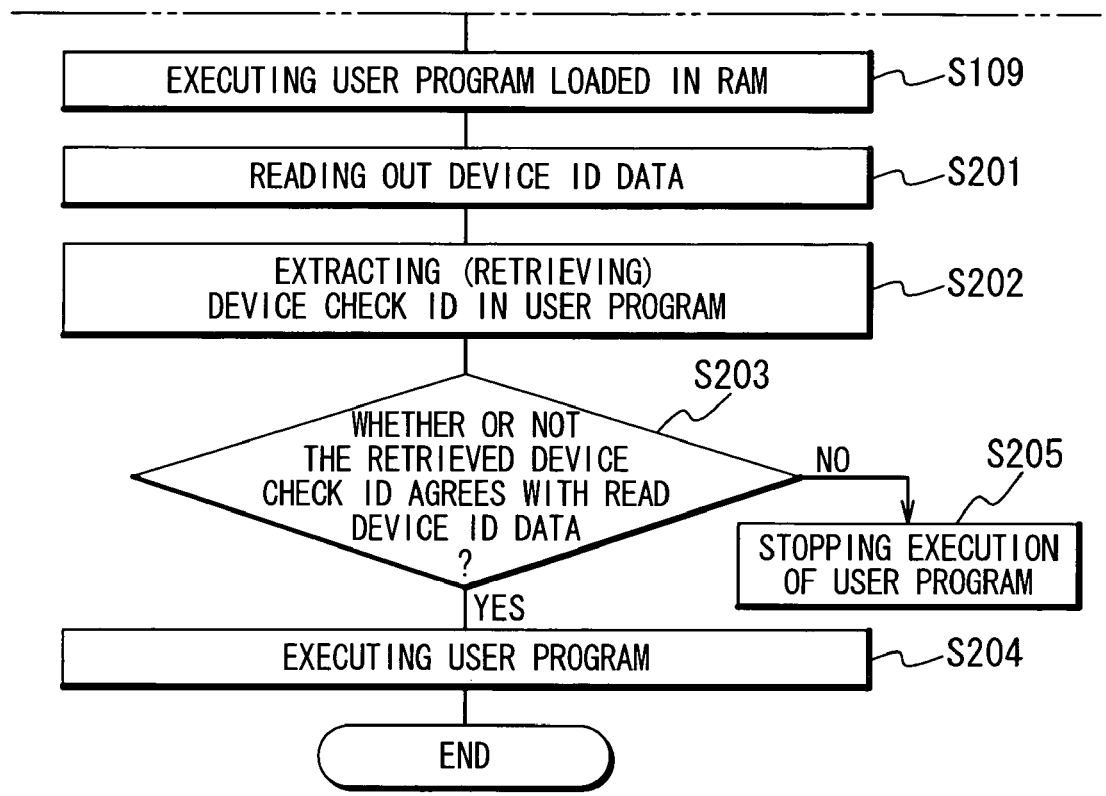

FIGS. 7A and 7B are flowcharts showing the operation of the second embodiment. Referring to FIGS. 7A and 7B, in this operation, the steps S101 to S109 in the second embodiment are substantially the same as the corresponding steps in the first embodiment. Therefore, a description below will be focused on the steps S201 to S205.

In the step S109, the CPU 3 of the LSI 11 drives the receiver 20 to operate by executing the user program that is loaded into the RAM 5. In the step S201, in response to the start of execution of the user program, the CPU 3 performs a reading operation of a device ID data from the device ID data storage portion 12, which is provided in the LSI 11.

In the step S202, in response to the end of the reading operation of the device ID data, the CPU 3 retrieves and/or extracts a device check ID contained in the post-decryption user program loaded into the RAM 5. The user code 35 preliminarily contains an encrypted device check ID. The CPU 3 can retrieve the device check ID from the user program by decrypting the user code 35 stored in the reprogrammable external ROM 4.

In the step S203 the CPU 3 judges whether or not the retrieved and/or extracted device check ID agrees with the read device ID data. Based on the result of the judging, if the retrieved device check ID dose not agree with the read device ID data, the processing proceeds to S205 and stops the execution of the user program. In response to the stopping of the execution of the user program, the CPU 3 of the computer 21 generates a program stop message and outputs the message to the communications interface 22. The outputted message is then transmitted to an address of the control apparatus 25 of the pay broadcasting system through the network 23. Based on the result of the judging in the step S203, if the retrieved device check ID agrees with the read device ID data, the processing proceeds to S204. In the step S204, the CPU 3 of the computer 21 continues the operation of the receiver 20 by execution of the user program loaded into the RAM 5.

Thus, according to the operation shown in the flowchart, not only the security measures wherein the decrypting program is stored in the activation ROM 2, but also the tamper detection using the security check code computed from the decrypted user program. Further, security checking is executed by using the device check ID contained in the user program and the device ID data stored in the LSI 11. This makes it possible to implement further robust protection of programs provided in the computer 21.

Third Embodiment

Figure 8:
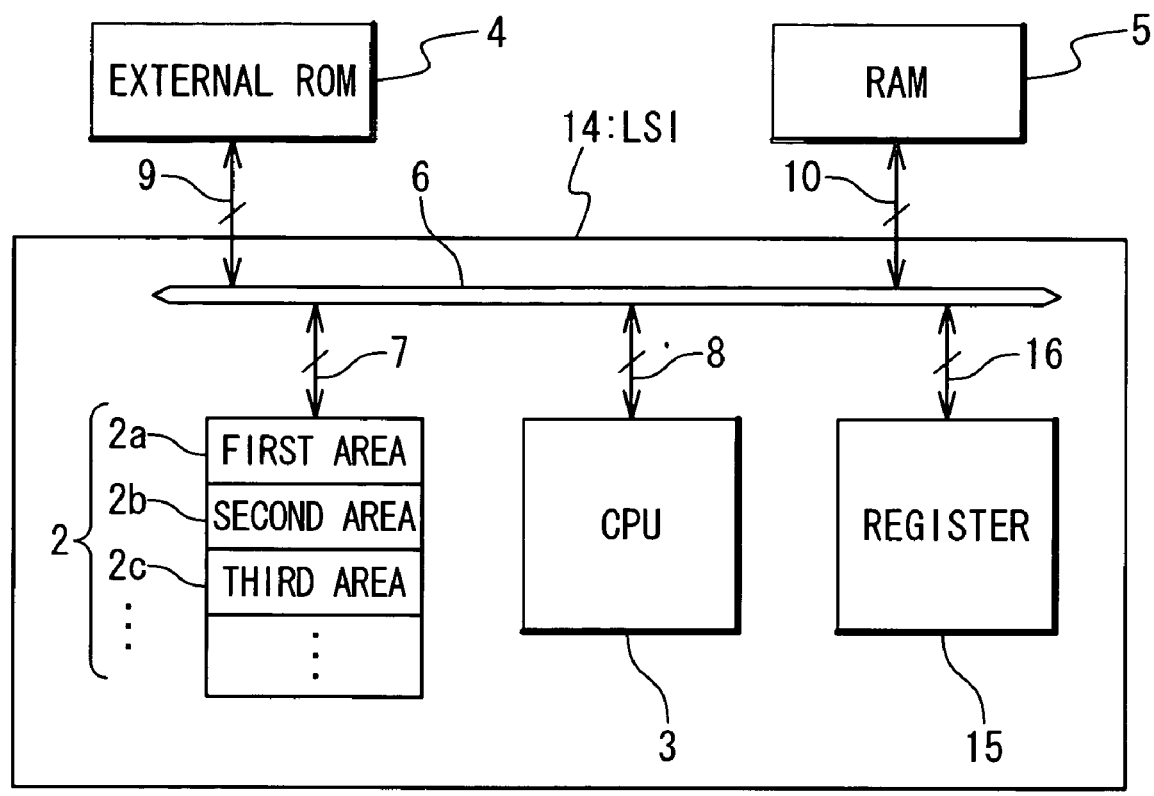
FIG. 8 is a block diagram showing the configuration of a program tamper detecting apparatus provided in the computer 21 according to the third embodiment of the present invention.

FIG. 8 is a block diagram showing the configuration of a program tamper detecting apparatus provided in the computer 21 according to the third embodiment of the present invention. Similar to the first embodiment, the program tamper detecting apparatus in this embodiment is adaptable to any product performing electronic control by using a computer. Similar to the first embodiment, the product having the computer 21 in this embodiment is used in the situation that the product is connected with an information communications network. Especially, a receiver 20 for a pay broadcasting system is described as an example of the product. The receiver for a pay broadcasting system tends to cause the problem of tampering with a computer program mounted in the product.

Referring to FIG. 8, the program tamper detecting apparatus described in the third embodiment includes the LSI 14, the reprogrammable external ROM 4, and the RAM 5. The LSI 14 includes the activation ROM 2, the CPU 3, the internal bus 6, and the register 15. Similar to the LSI 1, the LSI 14 is an integrated circuit configured to a single chip. The CPU 3 in the LSI 14 has a configuration similar to the CPU 3 described in the first embodiment, so that a description of the CPU 3 is omitted. In addition, the reprogrammable external ROM 4 and the RAM 5 in FIG. 8 are similar configuration to the reprogrammable external ROM 4 and the RAM 5 described in the first embodiment. Therefore, descriptions of the reprogrammable external ROM 4 and the RAM 5 in the third embodiment are omitted.

The activation ROM 2 has a plurality of areas, such as a first area 2a, a second area 2b, a third area 2c and so on, each of which stores data similar to the activation ROM 2 in the LSI 1. In addition, this plurality of areas may be arbitrarily increased or decreased by design changes. The register 15 is a storage circuit in the LSI 14. The register 15 stores data that is used to select a specific area from the plurality of areas in the activation ROM 2. The register 15 is connected to the internal bus 6 through a data line 16. The activation ROM 2 has a plurality of decryption programs. Each of the plurality of the decryption programs is stored in corresponding one of the plurality of areas, such as the first area 2a, the second area 2b, the third area 2c and so on. The encryption scheme of one of the plurality of the decryption programs is different from that of another of the plurality of the decryption programs. One of the plurality of areas corresponds to one of the plurality of the decryption programs in one-to-one relationships. A user program is encrypted as a user code 35 by the encryption scheme correspondingly to that of one of the plurality of the decryption programs. The user code 35 is stored into the reprogrammable external ROM 4.

In addition, a specific external terminal is preferably provided to the device, such as LSI 14, to select a specific area from the plurality of areas and then to determine the encryption scheme. At the time of activation, or resetting, the device determines the register 15 based on the data or signal supplied to the specific external terminal from outside, such as resetting signal or another memory device, and performs a read operation of a stored value from the register 15.

Figure 9:
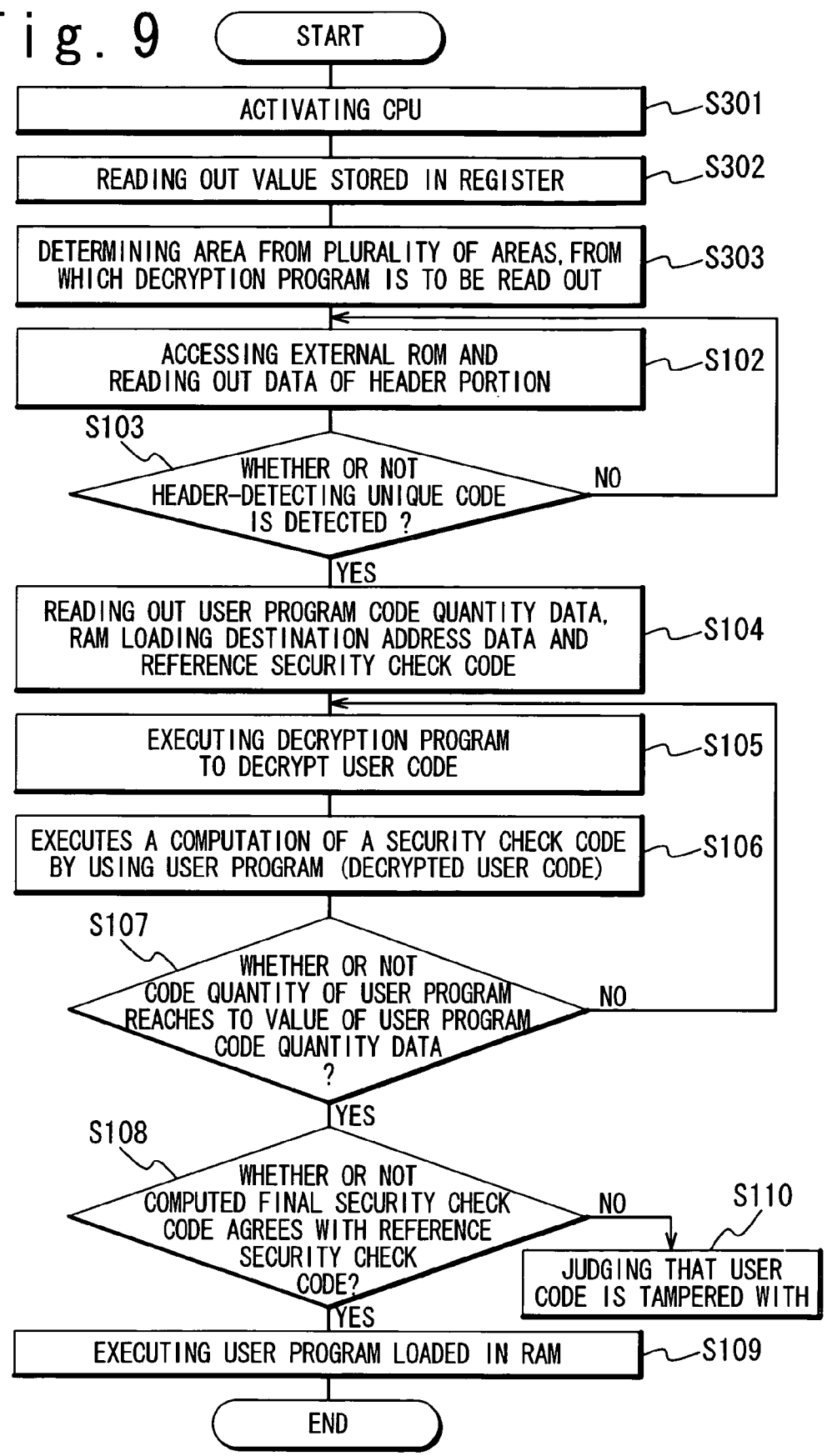
FIG. 9 is a flowchart showing the operation of the third embodiment.

FIG. 9 is a flowchart showing the operation of the third embodiment. Referring to FIG. 9, the operation of the steps S102 to S109 is substantially the same as that in the first embodiment. Therefore, a description will be focused on the operation of the steps S301 to S303.

In the step S301, in response to the start of execution of the receiver 20, the CPU 3 is activated by a CPU-activation program stored in the activation ROM 2 in the LSI 14. Immediately after being activated, the activated CPU 3 accesses the register 15 through the internal bus 6.

In the step S302, the CPU 3 executes a reading operation of a value stored in the register 15 based on the data supplied to specific external terminal used for the activation. In the step S303, based on the read value in the register 15, the CPU 3 determines an area from which a decryption program is to be read out from the plurality of areas, such as the first are 2a, the second area 2b, the third areas 2c and so on, of the activation ROM 2. The activated CPU 3 accesses the determined area of the activation ROM 2 through the internal bus 6, reads out and executes a decryption program stored in the activation ROM 2. Thereafter, the processing proceeds to the S102, and executes processes similar to those of the steps S102 to S109, or the step S110, performed in the first embodiment.

According to the operation shown in the flowchart, a plurality of encryption schemes of encrypted user programs to be stored in the reprogrammable external ROM 4 can be selected. In addition, even when an encrypted user program stored in the reprogrammable external ROM 4 has been analyzed, it is difficult to agree with an encryption scheme selected at the event of activation. This consequently enhances security for a program mounted the computer 21 with program tamper detection. Further, not only the security measures wherein the decrypting program is stored in the activation ROM 2, but also the security check using the code of the decrypted user program is executed. This makes it possible to implement further robust protection of programs provided in the computer 21 with program tamper detection functionality.

Further, providing with the plurality of storage areas the product can select the plurality of encryption schemes in the device, such as LSI, of the single, same type. Thereby, even when providing a plurality of different manufacturers of pay broadcast receivers 20 each having the computer 21, different encryption schemes can be provided to the manufacturers. Although the device is the same, an encryption scheme for use by one manufacturer can be uniquely set to be different from an encryption scheme for use by another manufacturer. Consequently, robust security measures can be implemented for individual user codes 35 stored in individual reprogrammable external ROMs 4.

As above, the first to third embodiments have been independently described; however, the embodiments may be combined with one another unless conflicts take place thereamong.

In an apparatus having an encrypted computer program, the present invention has a configuration that does not easily allow leakage of an encryption scheme thereof to the outside, thereby to provide an effect of enhancing security against leakage of data stored in the apparatus.

Further, the present invention provides an effect in that even when an encryption scheme has leaked, tampering with an encrypted computer program can be prevented, and further robust security measures can be implemented, thereby to enable the enhancement of security against leakage of data stored in the apparatus.

Further, the present invention provides an effect in that if tampering with a computer program has occurred, an operation for detecting the tampering is executed thereby to prevent the computer program from being kept executed without recognition of the tampering.

What is claimed is:

1. A program tamper detecting apparatus comprising:
   a random access memory (RAM),
   an external memory which stores a first code and a first program, wherein said first program is encrypted;
   an activation read only memory (ROM) which stores a second program which decrypts said first program; and
   a central processing unit (CPU) which is electrically connected to said external memory and said activation ROM,
   wherein said CPU decrypts said first program by executing said second program to obtain a decrypted first program,
   wherein said CPU detects tampering of said first program based on a comparison between said first code and a result of a predetermined operation executed on said second codes of said decrypted first program,
   wherein said CPU stores said decrypted first program in said RAM, reads out said second codes from said RAM, and detects tampering of said first program based on said comparison,
   wherein said external memory has an address data which specifies an address in said RAM, and
   wherein said CPU stores said decrypted first program in said RAM based on said address data, and reads out said second codes from said RAM based on said address data.

2. The program tamper detecting apparatus according to claim 1, wherein said activation ROM has an activation program, and
   wherein said CPU executes said second program by execution of said activation program, to obtain said decrypted first program.

3. The program tamper detecting apparatus according to claim 1, wherein there is a plurality of said second programs,
   wherein an encryption scheme of one of said plurality of second programs is different from that of another of said plurality of second programs, and
   wherein said CPU selects and executes one of said plurality of second programs.

4. The program tamper detecting apparatus according to claim 3, further comprising:
   a first memory portion which stores an area data that said CPU is used for selecting one of a plurality of areas included in said activation ROM,
   wherein said CPU selects said one of plurality of areas based on said area data, and
   wherein said CPU decrypts said first program by executing one of said plurality of second programs corresponding to said selected one of plurality of areas to obtain said decrypted first program.

5. The program tamper detecting apparatus according to claim 1, further comprising:
   a second memory portion which stores an identifier for identifying said program tamper detecting apparatus,
   wherein said decrypted first program has an identifier confirming data, and
   wherein said CPU detects tampering of said first program by checking said identifier confirming data with said identifier.

6. The program tamper detecting apparatus according to claim 1, wherein said activation ROM has a program tamper notifying program, and
   wherein said CPU generates a message indicating tampering of said first program, and sends said message to a device with a predetermined address through a network, by executing said program tamper notifying program in response to detection of tampering of said first program.

7. The program tamper detecting apparatus according to claim 1, wherein said CPU and said activation ROM are mounted on a single semiconductor device, and
   wherein said semiconductor device is connected to said external memory.

8. The program tamper detecting apparatus according to claim 4, wherein said CPU, said activation ROM and said first memory portion are mounted on a single semiconductor device, and
   wherein said semiconductor device is connected to said external memory.

9. The program tamper detecting apparatus according to claim 1, wherein said CPU executes said decrypted first, program to decode data received through a network, and outputs said decoded data to a processing device, when said CPU does not detect tampering of said first program.

10. A computer program product, tangibly embodied on a computer-readable memory, for a program tamper detecting apparatus including an external memory storing a first code and a first program, wherein said first program is encrypted, an activation read only memory (ROM) storing a second program which decrypts said first program, and a central processing unit (CPU) electrically connected to said external memory and said activation ROM, said computer program product being executed by said apparatus to perform a method of program tamper detection, said method comprising:

reading out said second program from said activation ROM;

executing said second program to obtain said decrypted first program; and detecting tampering of said first program based on a comparison between said first code and a result of a predetermined operation executed on said second codes of said decrypted first program, wherein said program tamper detecting apparatus further comprises a random access memory (RAM), wherein said executing said second program further comprises:

storing said decrypted first program in said RAM, and wherein said detecting tampering of said first program further comprises:

reading out said second codes from said RAM, wherein said executing said second program further comprises:

reading out an address data, which specifies an address in said RAM, stored in said external memory, wherein said storing said decrypted first program in said RAM further comprises:

storing said decrypted first program in said RAM based on said address data, and wherein said reading out said second codes from RAM further comprises:

reading out said second codes from said RAM based on said address data.

11. The computer program product according to claim 10, wherein said reading out said second program from said activation ROM further comprises:

executing an activation program stored in said activation ROM to activate said CPU.

12. The computer program product according to claim 10, wherein there is a plurality of said second programs, said activation ROM has a plurality of areas, each of said plurality of areas stores corresponding one of said plurality of second programs, an encryption scheme of one of said plurality of second programs is different from that of another of said plurality of second programs, wherein said reading out said second program from said activation ROM further comprises:

selecting one of said plurality of areas; and reading out one of said plurality of second programs corresponding to said selected one of plurality of areas, and wherein said executing said second program to obtain said decrypted first program further comprises:

executing said read one of said plurality of second programs.

13. The program tamper detecting apparatus according to claim 12, wherein said program tamper detecting apparatus further includes a first memory portion, and wherein said selecting one of said plurality of areas further comprises:

reading out an area data used for selecting said one of plurality of areas, said area data is stored in said first memory portion; and selecting said one of plurality of areas based on said area data.

14. The program tamper detecting apparatus according to claim 10, wherein said program tamper detecting apparatus further includes a second memory portion, and wherein said detecting tampering of said first program further comprises:

reading out an identifier for identifying said program tamper detecting apparatus, said identifier is stored in said second memory portion;

extracting an identifier confirming data from said decrypted first program; and detecting tampering of said first program by checking said identifier confirming data with said identifier.

15. The program tamper detecting apparatus according to claim 10, further comprising:

reading out a program tamper notifying program stored in said activation ROM; and generating a message indicating tampering of said first program, and sending said message to a device with a predetermined address through a network, by executing said program tamper notifying program in response to detection of tampering of said first program.

16. A method for program tamper detection comprising:

reading out a second program, tangibly embodied on a computer-readable memory;

executing said second program to obtain a decrypted first program by decrypting an encrypted first program; and detecting tampering of said first program based on a comparison between a predetermined first code and a result of a predetermined operation executed to second codes of said decrypted first program, wherein said executing said second program to obtain a decrypted first program further comprises:

reading out an address data which specifies an address in a random access memory (RAM); and storing said decrypted first program in said RAM based on said address data, and wherein said detecting tampering of said first program further comprises:

reading out said second codes from said RAM based on said address data.

17. The method for program tamper detection according to claim 16, wherein said reading out a second program, tangibly embodied on a computer-readable memory, further comprises:

executing an activation program for executing said second program.

18. The method for program tamper detection according to claim 16, wherein there is a plurality of said second programs, an encryption scheme of one of said plurality of second programs is different from that of another of said plurality of second programs, wherein said reading out a second program, tangibly embodied on a computer-readable memory, further comprises:

selecting one of said plurality of second programs; and reading out said one of the plurality of second programs, and wherein said executing said second program to obtain a decrypted first program further comprises:

executing said read one of said plurality of second programs.

19. The program tamper detecting apparatus according to claim 18, wherein said reading out said one of the plurality of second programs further comprises:

reading out an area data used for selecting said one of plurality of areas; and selecting said one of plurality of areas based on said area data.

20. The method for program tamper detection according to claim 16, wherein said detecting tampering of said first program further comprises:
reading out an identifier;
extracting an identifier confirming data from said decrypted first program; and
detecting tampering of said first program by checking said identifier confirming data with said identifier.

21. The method for program tamper detection according to claim 16, further comprising:
reading out a program tamper notifying program; and
generating a message indicating tampering of said first program, and sending said message to a device with a predetermined address through a network, by executing said program tamper notifying program in response to detection of tampering of said first program.

22. A program tamper detecting apparatus comprising:
an external memory configured to store a first code, and a first program which is encrypted;
an activation memory configured to store a second program which decrypts said first program;
a central processing unit (CPU) configured to be electrically connected to said external memory and to said activation memory; and
a random access memory (RAM),
wherein said external memory is adapted to also store address-specifying data for specifying an address in said RAM, and
wherein said CPU is configured to:
decrypt said first program by executing said second program to obtain a decrypted first program;
store in said RAM, at an address based on said address-specifying data, said decrypted first program;
read from said RAM at an address based on said address-specifying data, a second code or codes of said stored decrypted first program; and
detect tampering of said first program based on said first code, and a result of a predetermined operation executed on the second code or codes.

23. A method of tamper detection of a first program which is encrypted, said method comprising:
providing an external memory configured to store a first code and a first program which is encrypted, an activation memory configured to store a second program which decrypts said first program, a central processing unit (CPU) configured to be electrically connected to said external memory and to said activation memory, and a random access memory (RAM), wherein said external memory is adapted to also store address-specifying data for specifying and address in said RAM;
reading, from said external memory, said first program;
executing said second program to decrypt said first program and thereby obtain a decrypted first program;
storing in said RAM, at an address based on said address-specifying data, said decrypted first program;
reading from said RAM, at an address based on said address-specifying data, a second code or codes of said stored decrypted first program; and
detecting tampering of said first program based on said first code, and a result of a predetermined operation executed on the second code or codes.

* * * * *